Oct. 15, 1935.   W. C. WILSON   2,017,576
SCREEN STENCILING ART
Filed Jan. 23, 1931
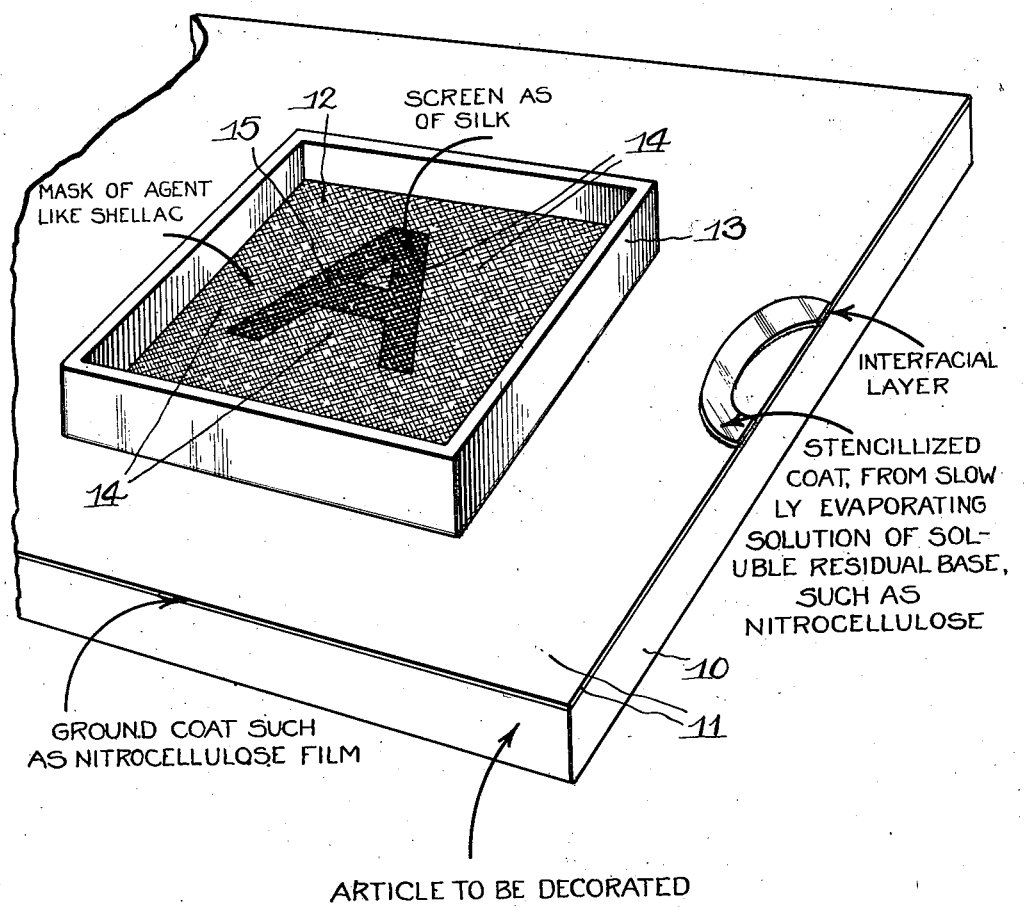

Patented Oct. 15, 1935

2,017,576

UNITED STATES PATENT OFFICE 2,017,576

SCREEN STENCILING ART

William Courtney Wilson, Chicago, Ill., assignor to Pyroxylin Products, Inc., Chicago, Ill., a corporation of Illinois Application January 23, 1931, Serial No. 510,657

6 Claims. (Cl. 101—129)

The present invention relates to "screen stenciling", having particular reference to the production of improved stencil work, and to improvements in the stencilizing process.

By the term "screen stenciling" I refer herein to that phase of stenciling now termed in the arts "silk screen stenciling" for the reason that it is at present carried out with silk screens. To facilitate understanding the nature of the improvements of this invention the present silk screen stenciling practice is described.

A surface to be decorated is covered with a silk screen carried by an open frame, usually in a box-like formation, in which the silk screen is the box bottom. A portion of the screen is blanked off to render it impervious, leaving a pervious portion as a design. A paint or varnish material covering the screen is forced through the pervious portions of the screen by pressure, usually produced by drawing a squeegee over the screen.

Paints and varnishes with a drying-oil base are employed because of their slow-drying character. Slow drying is a practical essential to prevent sticking of the stencil to the work, and to prevent the paste drying into the screen while the process is being carried on. The drying-oil-base pastes take up oxygen from the air and change chemically to include a new substance not easily removable. The drying of the pastes into the screen damages or ruins the screen. Prolonged use of the screen causes an accumulation of the oxidized product of the pastes.

In addition, the stencil work produced by the drying-oil pastes continues to oxidize after it is substantially dry to the touch. The oxidation continues, and the paint disintegrates, especially where it is exposed to weather. Many outdoor signs are made by this stenciling process, and in consequence the signs are subject to this deterioration.

It is well known that nitrocellulose and other bases are more durable than the drying oil paints and varnishes. Ordinary nitrocellulose lacquers are quick drying and cannot be used in the stenciling process. They dry so quickly that the screen adheres to the work. The screen clogs with the base because of rapid evaporation. The surplus paste left on the screen soon drys to the point where it is not workable.

One object of the present invention is to provide a process of screen-stenciling using a slow drying stencil paste having a residual non-oxidizing base and vehicle solvent.

A particular object is the provision of a screen-stenciling process using a paste having a cellulose ester base and a slowly evaporating solvent.

Other and ancillary objects and advantages of the invention will appear from the following description of the invention and from the accompanying drawing.

In the drawing there is an article 10 having a surface to be decorated, such as a sign board. A coating 11 of suitable material may be placed over the surface of the article as a ground coat, such as a nitrocellulose film from a commercial lacquer. Paint or varnish, or a resin film, may also be used as the background. However, I prefer to use the same base as is employed in the material of which the stencilized decoration is composed, because the two bases, being the same, have the same properties, and adhere well together, or unify. This eliminates differences in weathering properties, in coefficients of expansion and contraction, and prolongs the life of the work.

On the coat 11 a screen stencil is placed, being in the present instance a silk screen 12 carried by a frame 13. A letter A represents a design. It is formed by blocking the screen elsewhere in the areas 14 not covered by the design. The screen is exposed and is pervious at 15 over the area of the design. Paste in the screen may be pressed through the design by a squeegee (not shown) or by any other means.

The paste employed comprises a soluble stable residual base and a slowly evaporating solvent therefore, determined with relation to room temperatures and the conditions of using stencil pastes for attaining the advantages of the present invention.

As a measure of slowness I refer to a test which may be made. For example, a commercial hand brushing nitrocellulose lacquer may be placed in a flat dish to a depth of $\frac{3}{4}$ inch exposed in a room at 75° F. without forced ventilation. About one-half of the volatile solvent will disappear in three hours. In the trade this is called "slow" for a lacquer, but it is "fast" for a stencil paste. In the preferred embodiments of my invention the stencil paste under these same conditions will not lose ½ of its volatile solvent in less than 6 hours.

As a base I use nitrocellulose with or without the customary modifying agents such as pigments, resins, plasticizers, gums and the like well known to the art. These are all substantially inert to each other, and to the air. I characterize the non-volatile ingredients as being stable, but limit the property of stability to that exhibited under the conditions of use in this invention. The base is characterized as soluble, but this is in reference to the solvent employed as a vehicle to form it into the stencil paste. To other materials, such as water, it may be insoluble. Certain of the modifying agents may be soluble, such as the gums, resins and plasticizers, and others may be insoluble and finely divided and dispersed, such as pigments.

As solvents I use volatile liquids which dissolve the base, from which they will evaporate. By volatile I mean the property of substantially completely but slowly evaporating from the base to leave as a residual film the non-volatile ingredients. Hydrocarbons, alcohols, ethers, ketones, and esters are classes of solvents which may be employed alone or in admixture with each other. The choice of a solvent, or the mixing of solvents, may be determined in part by the nature of the base material and any accompanying modifying agents employed with the base. All the ingredients must be mutually compatible in the mixture employed. All of the solvents need not be capable of themselves of dissolving the base, such as cellulose ester, employed, but it is necessary that the solvent or mixture of solvents be capable of holding the cellulose ester, and the resin and plasticizer in solution. For example where nitrocellulose is used, a certain proportion of hydrocarbons and alcohols, which of themselves are not solvents for nitrocellulose, may be used, provided there is also present a sufficient amount of active cellulose base solvent, for example butyl furoate, to render the mixture capable of holding the cellulose base in solution.

Examples of hydrocarbons useful for my purpose are "Tetralin" which is tetrahydronaphthalene, boiling at 206° C., and the well known heavy naphtha. Among the alcohols there is "Hexalin" which is cyclohexanol, boiling at 155° to 160° C. Among the ethers and esters there are Ethyl benzoate_____boiling at 213° C.
Butyl lactate_____ 175° C. to 195° C.
Methyl furoate_____ 181.3° C.
Ethyl furoate _____ 198° C.
Propyl furoate_____ 211° C.
Butyl fuorate _____ 222° C.
Amyl fuorate_____ 233° C.
"Carbitol" (mono ethyl ether of diethylene glycol)

Although I have given certain boiling ranges in the above table, I wish it to be understood that I aim to include commercial materials appearing on the market as and for, and under the name given to, the above materials, in spite of the fact that commercial solvents may contain small quantities, and even up to 10% or more, of lower boiling solvents.

The esters of furoic acid are particularly useful because they are excellent solvents for nitrocellulose and the usual modifying agents associated therewith. The rate of evaporation is particularly suitable for stencil pastes, and the diminution of solvent by evaporation does not cause nitrocellulose to come out of solution. They impart to a stencil paste the physical properties which characterize the oil-drying pastes, so far as manipulation is concerned, without having the disadvantageous properties above mentioned. Screens contaminated with pastes in use of the present invention may be readily cleaned by application of solvent.

Numerous compositions for practice of the invention may be made. In the following examples "regular soluble" commercial nitrocellulose may be employed, such as ½ second soluble cotton, and it is to be understood that the parts by weight given in the following formulæ are the "wet" weight. Commercial "wet" nitrocellulose contains 30% ethyl alcohol. The true weight of nitrocellulose may be obtained by using the factor 0.7 in the formulæ. The following may be used as vehicles for pigments:

*Example 1*

| | By weight |
|---|---|
| Regular soluble nitrocellulose (wet) | 240 |
| Glyptal resin | 180 |
| Soluble phenol aldehyde resin | 40 |
| Diamyl phthalate | 130 |
| Hexalin | 400 |
| Amyl acetate | 60 |
| Butyl furoate | 300 |
| Butanol | 100 |
| | 1450 |

*Example 2*

| | By weight |
|---|---|
| ½ second nitrocellulose (wet) | 600 |
| Ester gum | 475 |
| Soluble phenol aldehyde resin | 50 |
| Dibutyl phthalate | 325 |
| Tetralin | 200 |
| Amyl furoate | 100 |
| | 1750 |

*Example 3*

| | By weight |
|---|---|
| Nitrocellulose (wet) | 348 |
| Glyptal resin ("Resyl" No. 12) | 284 |
| Dibutyl phthalate | 104 |
| Blown castor oil | 24 |
| Carbon black | 88 |
| Xylol | 94 |
| Hexalin | 282 |
| Carbitol | 376 |
| | 1600 |

*Example 4*

| | By weight |
|---|---|
| ½ second regular soluble nitrocellulose (wet) | 300 |
| Wax free gum damar | 425 |
| Soluble phenol aldehyde resin | 50 |
| Dibutyl phthalate | 225 |
| Castor oil | 300 |
| Hexalin | 1100 |
| Butyl furoate | 600 |
| | 3000 |

(A pigment such as 15 parts of titanium oxide (TiO$_2$) may be incorporated in the above for example 23 parts.)

*Example 5*

| | By weight |
|---|---|
| Regular soluble nitrocellulose (wet) | 600 |
| Glyptal resin ("Resyl" No. 12) | 475 |
| Soluble phenol aldehyde resin | 50 |
| Dibutyl phthalate | 200 |
| Castor oil | 300 |
| Butyl lactate | 1500 |
| Xylol | 1500 |
| | 4625 |

From the foregoing it will be readily understood that mixtures of the various individual solvents given herein may be employed. The invention is not limited to the use of commercial ½ second nitrocellulose found on the market at the present time. Nitrocellulose of different viscosity characteristics may be used. Commercial nitrocellulose of today is a "modified nitrated cellulose". By this I refer to a nitrated cellulose which has been specially treated to alter its viscosity characteristics. I may use unaltered nitrated cellulose, particularly one of low viscosity obtained directly by nitration, such as that described in my copending application Serial No. 119,995, filed July 1, 1926.

As is well known in the art, the durability of a pyroxylin lacquer finish is largely dependent upon the proper choice of the non-volatile, or film-forming constituents. My invention permits the use of a range of such non-volatile constituents as broad as is found in the finishing art. There may be used in combination with the cellulose esters substantially any resins, plasticizers, pigments, or other modifying agents that are useful in the production of cellulose ester lacquers. As a matter of fact, so far as the non-volatile film-forming constituents are concerned, the same ingredients may be used as are used in any cellulose ester lacquer or spirit varnish.

It is obvious that a choice of solvents is necessary for the successful operation of my invention. While a wide range of solvents and many combinations of solvents are available, those useful for my purpose must have a relatively low vapour pressure at prevailing atmospheric temperatures. While the ordinary lacquer solvents such as butyl acetate, amyl acetate, butanol, xylol, etc., may be used to a limited extent insolvent combinations, it is desirable to use an appreciable amount of one or more less volatile solvents having boiling ranges above 150° C. Wherein I refer to a solvent of low volatility I means to designate a volatile solvent or solvent combination at least half of which has a boiling point above 150° C. Wherein I refer to a slowly evaporating cellulose ester paste I refer to one which will retain at least one-half of its volatile solvent for six hours on exposure in a room at 75° F. in a flat dish with an initial depth of $\frac{3}{32}$ inches, without forced ventilation.

The examples given above and other compositions employing the combination of "hexalin" (cyclohexanol) and furoic acid esters have been found to be particularly desirable because when shellac is employed as the masking agent in forming the screen stencil, the compositions have very little action on the shellac, and the stencil has a long life. This is particularly true for compositions wherein the furoic acid ester, such as the butyl furoate, is present to the extent of at least 20% of a solvent mixture.

The advantages of the invention are to be found in the working of the stenciling process, and in the improved product obtained thereby. The reactive (oxidizing) properties of the prior art paints and varnishes are eliminated, and there is substituted an inert soluble solute with or without solid dispersed pigment, and an inert solvent. The plastic or viscous condition of the paste is prolonged by the low volatility of the solvent, without any reaction or gumming by oxidation from the air. Residual material may be easily removed by solvents and the stencil may then be readily kept clean. All the valuable and stable features of nitrocellulose coatings may be brought into the stencilizing art of decorating, giving more durable coatings. A nitrocellulose background may be united with a nitrocellulose film of decoration. This is particularly desirable for finishes for out-of-doors exposure, such as signs, or insignia placed by stencilizing onto the bodies of automobiles finished with nitrocellulose lacquers. The fact that the solvent in the decorative coating is slowly evaporatable causes the decorative coating to remain "wet" for a long time so that migration of the solvent takes place from the decorative coat onto the ground coat and the base materials diffuse together in an interfacial layer forming a sort of weld or homogeneous union which integrally unites the two coats.

In the appended claims I aim to define the invention in its broadest scope, without limiting it to the specific illustrative examples herein given, and I aim to include within the scope of the claims such changes and modifications as I have hereinabove given as well as those changes and modifications which will naturally occur to those skilled in the art.

I claim:

1. The method of making a decorated surface which consists of applying to the surface through a screen stencil a composition having a base consisting of cellulose ester dissolved in a volatile solvent, said solvent being characterized by the ability to evaporate from the composition at such a rate that when a layer of said composition $\frac{3}{32}$ inch in thickness is exposed at 75° F. without forced ventilation not more than one-half of the solvent is lost by evaporation in six hours, said composition being characterized by being substantially non-oxidizing, and by such slow-drying properties that the screen does not stick to said surface during the stenciling operation, and remains wet for a sufficiently long period to permit continuous re-use of the stencil.

2. The method of making a decorated surface which consists of applying to the surface through a screen stencil a composition having a base consisting of nitrocellulose disolved in a volatile solvent, said solvent being characterized by the ability to evaporate from the composition at such a rate that when a layer of said composition $\frac{3}{32}$ inch in thickness is exposed at 75° F. without forced ventilation not more than one-half of the solvent is lost by evaporation in six hours, said composition being characterized by being substantially non-oxidizing, and by such slow-drying properties that the screen does not stick to said surface during the stenciling operation, and remains wet for a sufficiently long period to permit continuous re-use of the stencil.

3. The method of making a decorated surface which consists of applying to said surface through a screen stencil a composition comprising a base consisting of nitrocellulose dispersed in a volatile solvent, said solvent comprising organic liquids at least half of which boil above 150° C., said composition being characterized by being non-oxidizing, and by such slow-drying properties that the screen does not stick to said surface during the stenciling operation, and remains wet for a sufficiently long period to permit continuous re-use of the stencil.

4. The method of making a decorated surface which consists of applying to said surface through a screen stencil a composition having a base consisting of cellulose ester and having a solvent capable of holding said cellulose ester, a resin and a plasticizing agent, said solvent comprising an ester of an acid selected from the list: benzoic, lactic and furoic (pyromucic), said ester boiling at least not lower than substantially 150° C., said composition being characterized by being non-oxidizing, and by such slow-drying properties that the screen does not stick to said surface during the stenciling operation, and remains wet for a sufficiently long period to permit continuous re-use of the stencil.

5. The method of making a decorated surface which consists of applying to said surface through a screen stencil a composition having a base consisting of cellulose ester and having a solvent which includes a substantial quantity of ester of furoic acid with an alcohol from methyl to amyl inclusive, said composition being characterized by being non-oxidizing, and by such slow-drying properties that the screen does not stick to said surface during the stenciling operation, and remains wet for a sufficiently long period to permit continuous re-use of the stencil.

6. The method of making a decorated surface which consists of applying to said surface through a screen stencil a composition having a base consisting of cellulose ester and having a volatile solvent capable of holding said cellulose ester, a resin and a plasticizing agent, said solvent comprising organic liquids at least half of which boil above 150° C., said composition being characterized by being non-oxidizing, and by such slow-drying properties that the screen does not stick to said surface during the stenciling operation, and remains wet for a sufficiently long period to permit continuous re-use of the stencil.

WILLIAM COURTNEY WILSON.